Patented Jan. 3, 1939

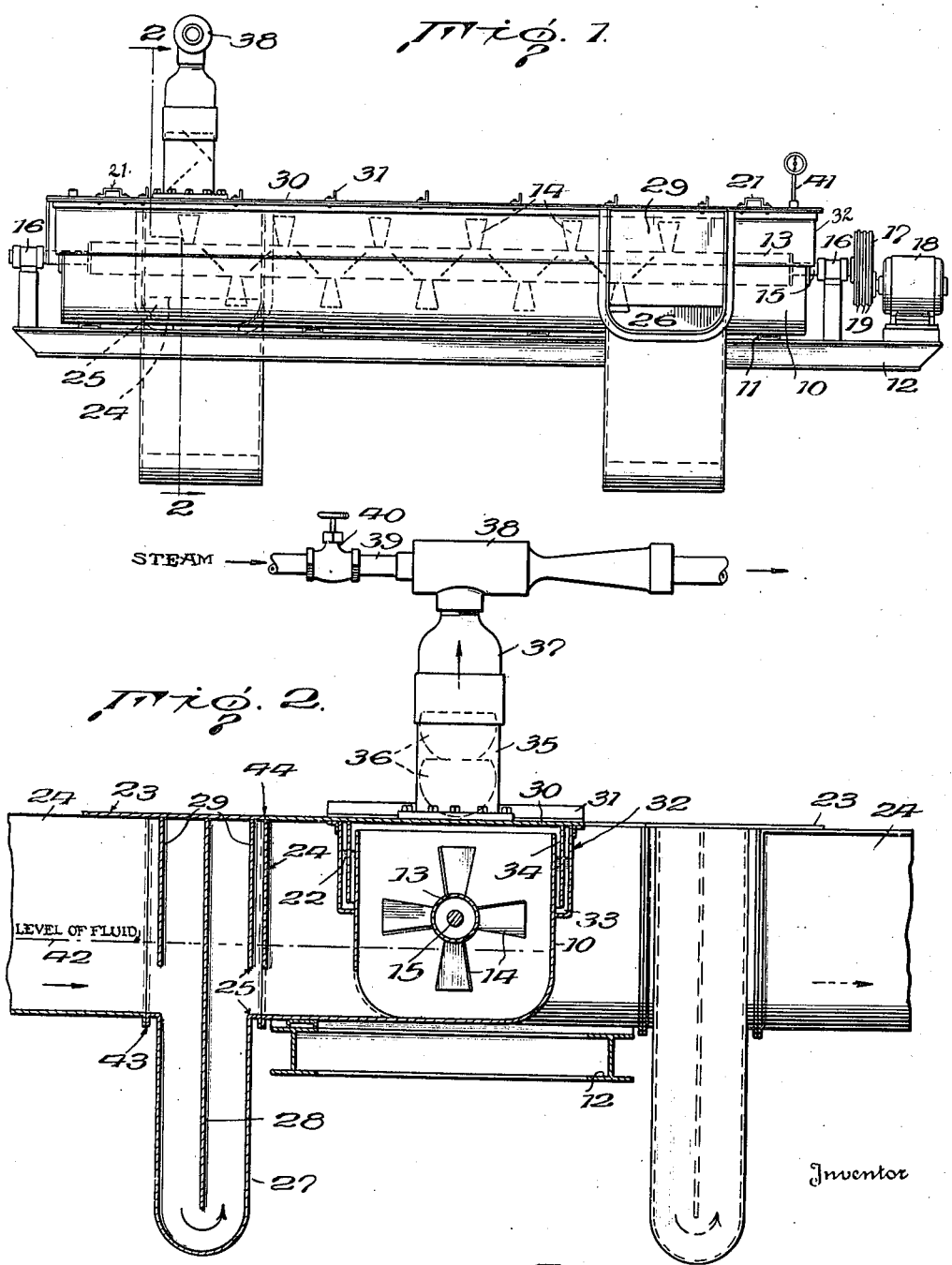

2,142,270

UNITED STATES PATENT OFFICE 2,142,270

APPARATUS FOR RECLAIMING DRILLING FLUIDS

Jan Vander Henst, Houston, Tex., assignor to Gulf Oil Corporation, Pittsburgh, Pa., a corporation of Pennsylvania Application December 18, 1936, Serial No. 116,605

3 Claims. (Cl. 183—2.5)

This invention relates to apparatus for reclaiming drilling fluids; and it comprises apparatus for freeing used drilling fluids of gases and light volatiles, comprising an elongated, covered trough-like container for holding a circulating body of drilling fluid, means for putting the container under subatmospheric pressure, an inlet and an outlet adjacent opposite ends of the container, conduit connections for the inlet and outlet arranged at substantially the same level as the container, and goose-neck trap means for said inlet and outlet connections to insure maintenance of the subatmospheric pressure within the container while the fluid circulates therethrough; all as more fully hereinafter set forth and as claimed.

In drilling wells for gas or oil by reciprocating or rotary methods it is customary to circulate a mud fluid through the well and around the drill during the drilling operation. The fluid is ordinarily an aqueous suspension of solid matter such as clay or bentonite, often together with finely divided heavy solids such as iron oxide or barytes. Sometimes plain oil or water is used.

The mud fluid has several well recognized functions: to lubricate and cool the drill bit and stem; to deposit solid or gelatinous matter on the bore walls and thereby seal crevices and pores whereby loss of fluid into the adjacent formations is prevented; and to carry up drill cuttings and sand to the surface for removal. There is another function of mud fluids which in some cases is the most important of all: prevention of escape of gas from the well. During drilling, the drill penetrates various sand and shale formations. Some may contain gas under very high pressure (up to 3000 pounds per square inch or more) which tends to enter the well. When the bore is filled with a column of fluid, this exerts a hydrostatic pressure at any point in the well, proportional to the height and the density of the fluid column, and this pressure counteracts the gas pressure to a greater or less degree. However, as drilling proceeds, the fluid entraps gas, which expands as bubbles as the fluid rises, thereby lessening the density of the fluid. Release of entrapped gas is essential before the fluid is returned to the well, to avoid progressive lessening in density (gas cutting). If the fluid gets unduly gas-cut, the density may drop to a point where the fluid no longer counteracts the well pressure, and a blowout may occur, with disastrous results.

The fluid may entrap, absorb, dissolve or disperse besides natural gas (methane), higher molecular weight substances such as propane and butane, and even gasoline (octane, etc.) and high gravity crude oil (50° Bé. or higher) associated with gas. Complete release of gas becomes much more difficult, and in some cases impossible in the presence of high gravity gasoline fractions.

Various mechanical methods have been proposed for freeing the mud fluid of some of the entrapped gas, as for instance long settling ditches assisting in the extrication, but some of the gas and most of the high gravity gasoline may not separate from drilling fluids even after settling in open pits for months.

As an illustration of the dangerous effects of gasoline retained in drilling fluids, there may be cited the case of a certain well, which during drilling blew out and destroyed the drilling rig, forming a crater 800 feet across. Samples of the drilling fluid which had been blown out were found on analysis to contain some 25 cc. per liter of high gravity gasoline. This gasoline was picked up by the fluid from a shale layer lying above the producing formation. The drilling fluid became gas cut and was unable to restrain gas pressures down the bore.

Investigations carried out by me have shown that the conditions wherein blowout is most likely to occur are when the drilling fluid is being saturated with high gravity gas prior to hitting the pay zone (producing layer). If the fluid can be kept at a density of at least 10 to 10.5 pounds per gallon and can be kept free of gas and gasoline, chances for blowout are minimized.

I have discovered that release of gas and gasoline from any mud fluid, whether of a clay, bentonite or other mineral base, and whether of aqueous or oil type, is greatly facilitated by a process involving strong agitation of the mud fluid and lowering the atmospheric pressure on the fluid.

In the best mode of procedure at present known to me, the used drilling fluid is passed into an elongated, enclosed chamber and is therein subjected to thorough and violent agitation. At the same time a high degree of vacuum is established and maintained on the chamber, and under these conditions gas and light volatiles are speedily extracted from even the most viscous or gas-retaining drilling fluids, the proportion of such impurities being reduced to a negligible value. The fluid is conveniently passed through the chamber in slow circulation, as part of the usual circulation of fluid in well drilling. That is, the fluid as it issues from the well is flowed through a trough into the chamber and thence back to the well. Usually, in known mud circulation systems, some means are provided for removing entrained sand and cuttings; e. g. a settling tank or revolving screen. Such means can be provided, if desired, either before or after my degassing system. The invention can also be employed at central mud reconditioning plants, to which fluids are sent for reclaiming. The fluid may be heated if desired to assist the extrication.

In the best embodiment of apparatus now known to me for carrying out the process, there is provided a horizontal elongated, covered trough-like chamber, having an inlet and an outlet near opposite ends thereof for mud fluid, and a revolving agitator adapted to agitate the fluid violently in the chamber and at the same time move it from the inlet to the outlet. Powerful suction means are provided arranged to produce a high degree of vacuum in the chamber. Traps are provided for the inlet and outlet to make possible maintenance of a high vacuum in the chamber while the mud is flowing.

In the accompanying drawing, I have shown, more or less diagrammatically, one form of a specific embodiment of apparatus within the purview of the invention and adapted for carrying out the method. In the showings, Fig. 1 is a view in side elevation of the degassing machine and Fig. 2 is a view taken along line 2—2 of Fig. 1.

In the drawing, the apparatus is shown as comprising an elongated trough-like container 10 with rounded bottom as shown and supported by means of spaced cross pieces 11 upon a frame 12. In the container is positioned an agitator comprising a tubular central member 13 provided with blades 14 mounted helically thereon. The tubular member is carried on a shaft 15 supported at the ends in bearing supports 16 and having a pulley 17 at one end. A motor 18 and V-belts 19 are arranged to rotate the agitator at high speed. The container has an inlet opening 25 near the bottom at one end, the opening being defined by a baffle 24 arranged as shown and a similar outlet opening 26 near the bottom of the other end, having a similar baffle. The inlet and outlet are in communication with steel flumes 24 which are part of a conventional mud circulating system. Advantageously, though not necessarily, the inlet and outlet are provided with goose-neck traps, to aid in maintaining vacuum within the container. Each trap comprises a downwardly extending portion 27, a baffle plate 28 extending near the bottom of portion 27 and two other baffles 29, all arranged as shown. The traps are covered as at 23, the covers extending a short distance out over the flumes, as shown.

The container is provided with a cover in the form of a flat plate 30 reinforced by cross pieces 31. A vacuum-tight seal is made by providing a spaced collar 32 extending entirely around the container and defining a chamber 33. The cover has downwardly extending baffles 34 extending into the chamber. Prior to operation, this chamber is partially filled with mud or other sealing liquid as shown at 22 and a gas-tight seal is thereby formed, while the cover may be readily removed simply by lifting it off, handles 21 being provided for this purpose.

The cover is provided with an upwardly extending connection 35 having baffles 36 arranged therein as shown, and having a reducer 37. Suction is applied through this extension. One convenient way of doing this is by means of a steam jet exhauster, as shown at 38. Steam is supplied through pipe 39 controlled by valve 40. A vacuum gauge 41 is provided to register the vacuum within the container.

With the goose-neck traps in place as shown, a considerable degree of vacuum can be maintained; 8 inches of mercury or more below atmospheric pressure (about 30 inches at sea level). With the traps not in use, the baffles 24 at the trough inlet and outlet permit imposing a vacuum up to about 2 inches of mercury below atmospheric; which is sufficient in many cases.

In operation, gassy mud fluid is flowed in through the inlet 25 and passes through the apparatus and out through outlet 26. The fluid level in the flumes and in the container (when the agitator is not running) is maintained at about the point indicated at 42. The agitator is driven at high speed and strong suction is applied. The agitation is sufficient to break up the mud fluid and keep it violently in motion while at the same time moving it slowly from the inlet toward the outlet. Gas and like volatiles escape from the mud fluid and are withdrawn through the exhauster.

The amount of agitation and degree of vacuum depend on the condition of the mud, and the tolerance as regards gas cutting. In general, the amount of agitation is such that a given particle of mud stays in the container about ½ to 1½ minutes and the vacuum is adjusted to about 8 to 11 pounds per square inch absolute pressure (11 pounds equals about 8 inches of mercury below atmospheric pressure).

The device is readily portable. It may be moved from place to place as a unit simply by disconnecting the flumes at joint 43 (and if desired also disconnecting the goose-neck traps at joint 44) and lifting the structure on to a truck.

The apparatus is ordinarily embodied in common soft steel, which may be galvanized or otherwise protected in case certain special chemical muds are used. If desired, the container, cover and traps can be wood-lined or made entirely of wood, concrete or other suitable material.

In an example of a specific embodiment of my method, the method was practiced at a well where the drilling fluid was an aqueous suspension of bentonite and iron oxide, weighing when freshly made, 12.0 pounds per gallon. The well penetrated gas and gasoline bearing strata, and the mud fluid issuing from the bore contained gas and gasoline in such proportions as to give the fluid an apparent density of only 9.8 to 10 pounds per gallon. The fluid, even on standing for two weeks, tenaciously retained gasoline in amount about 10.75 to 15 cc. of 50° Bé. hydrocarbon, per liter; an objectionable amount. In accordance with the invention the fluid was subjected to strong agitation in the apparatus described, being passed through the apparatus at a rate of about 250 to 300 gallons per minute. A vacuum of 11 pounds per square inch absolute pressure (8 inches of mercury below atmospheric) was maintained in the container. Under such conditions, the fluid after treatment was substantially free of light volatiles; only some 5 cc. per liter remaining. This proportion could be further reduced if desired by maintaining a higher degree of vacuum. In the operation described, the density of the fluid was brought from 9.8–10.0 up to 11.5–12.0 pounds per gallon.

The speed of agitation and the reduction in pressure necessary for release of gasoline and gas is determined largely by the amount of high gravity gasoline in the fluid. For example, the presence of 10 to 15 cc. of 51 degrees Bé. gasoline per liter of fluid required for release an agitation of 200 R. P. M. (circumferential velocity of blades 700 feet per minute) and a pressure reduction of 12.5 pounds per square inch absolute pressure. If only 4 cc. per liter were present, the agitator speed could be reduced and the vacuum maintained to only 14 pounds per square inch absolute (2 inches of mercury below atmospheric pressure).

If desired, the mud fluid can be chemically treated prior to degassing, to put it in a condition wherein gas and gasoline are more readily extricated. Thus the viscosity and other properties of the fluid can be controlled by use of gallic acid, tannic acid or phosphates, in a known manner.

Hitherto, to safeguard against blowouts, it has been customary to over-weight the drilling fluids; to use excess quantities of iron oxide, etc., to make sure of keeping a safe density. When a mud became permanently gas cut it has often been necessary to discard it. Operating under the present invention, the fluid need be weighted only to a moderate extent, and moreover no fluid need be discarded because of gas cutting. As a result, I am often able to save as much as 50 per cent on the cost of loading materials used in drilling a well; a considerable saving, since the cost of loading materials for drilling a single well may come to $35,000 or $40,000.

My method obviates dilution of the mud. Dilution is undesirable because of the difficulty of reconcentrating. Insofar as water is evaporated off during my method, the fluid is actually concentrated; though this effect is usually rather small. In typical cases, one or two barrels of water are added daily to the fluid to make up for water lost by evaporation.

The gas and gasoline extricated from the fluid can be collected if desired, for use, by causing the exhausting means to deliver into suitable gas collecting means, such as an open-bottomed drum immersed in water.

What I claim is:

1. A machine for freeing drilling fluids of volatile hydrocarbons which comprises a horizontally elongated enclosed container for holding a circulating body of fluid, means for putting the interior of the container under subatmospheric pressure, an inlet adjacent one end of the container and an outlet adjacent the other end, and trap means for the inlet and for the outlet, said trap means comprising a covered sump-like chamber extending below the level of the bottom of container, a baffle in the chamber extending from the top downward near to the bottom thereof, so constructed and arranged as to seal the interior of the container from the atmosphere, and conduit means arranged to deliver fluid to the trap means, the bottom portion of the conduit means being substantially at the level of the container bottom.

2. A machine for freeing used drilling mud fluids of gas and light volatiles which comprises an elongated, substantially horizontal trough-like closed container for holding a body of fluid, the bottom of the container being smooth to provide unrestricted longitudinal flow of fluid, an agitator within the container extending along the length thereof, means for applying suction to the upper part of the interior of the container, means providing a sump adjacent each end of the container outside the container, the sumps being arranged for attachment to troughs for flowing fluid, a depending baffle in each sump so constructed and arranged as to provide a liquid trap, and a cover for each sump sealing the top thereof, whereby fluid can flow through the traps and the container while vacuum is maintained in the container.

3. A machine for freeing used drilling fluid of gases and light volatiles which comprises a horizontally elongated enclosed container for holding a circulating body of fluid, means for putting said container under substantial subatmospheric pressure, an inlet and an outlet for the container delivering through the lower portion of the container adjacent the container ends, conduit connections for the inlet and outlet arranged at substantially the same level as the container bottom, and goose-neck trap means arranged between the inlet and the inlet conduit connection, and between the outlet and the outlet connection to insure maintenance of the subatmospheric pressure in the container while fluid passes therethrough.

JAN VANDER HENST.